US008933666B2

(12) United States Patent
Schwartz et al.

(10) Patent No.: US 8,933,666 B2
(45) Date of Patent: Jan. 13, 2015

(54) DEVICE AND METHOD FOR CONTINUOUSLY EQUALIZING THE CHARGE STATE OF LITHIUM ION BATTERY CELLS

(75) Inventors: Paul D. Schwartz, Arnold, MD (US); Mark N. Martin, Ellicott City, MD (US); Lewis M. Roufberg, Clarksville, MD (US)

(73) Assignee: The Johns Hopkins University, Baltimore, MD (US)

( * ) Notice: Subject to any disclaimer, the term of this patent is extended or adjusted under 35 U.S.C. 154(b) by 652 days.

(21) Appl. No.: 13/181,132

(22) Filed: Jul. 12, 2011

(65) Prior Publication Data

US 2012/0007559 A1     Jan. 12, 2012

Related U.S. Application Data

(60) Provisional application No. 61/363,315, filed on Jul. 12, 2010.

(51) Int. Cl.
*H02J 7/00* (2006.01)

(52) U.S. Cl.
CPC .................................. *H02J 7/0016* (2013.01)
USPC .......................................... 320/125; 320/136

(58) Field of Classification Search
CPC ................................ H02J 7/0016; H02J 7/007
USPC .......................... 320/119, 122, 125, 136, 164
See application file for complete search history.

(56) References Cited

U.S. PATENT DOCUMENTS

| | | | |
|---|---|---|---|
| 5,652,501 A | 7/1997 | McClure et al. | |
| 5,886,502 A | 3/1999 | Higashijima | |
| 5,920,179 A * | 7/1999 | Pedicini | 320/122 |
| 5,932,990 A | 8/1999 | Kaneko | |
| 6,034,506 A | 3/2000 | Hall | |
| 6,121,751 A | 9/2000 | Merritt | |
| 6,157,167 A | 12/2000 | Schwartz et al. | |
| 6,445,159 B1 | 9/2002 | Ramsden | |
| 6,777,908 B2 | 8/2004 | Thorne et al. | |
| 6,933,703 B2 | 8/2005 | Dubac et al. | |
| 6,975,094 B1 | 12/2005 | Lascaud et al. | |
| 7,003,679 B1 | 2/2006 | Lesea et al. | |
| 7,091,696 B2 | 8/2006 | Saigo et al. | |
| 7,126,312 B2 | 10/2006 | Moore | |
| 7,193,392 B2 | 3/2007 | King et al. | |
| 7,245,108 B2 | 7/2007 | Chertok et al. | |
| 7,362,074 B2 * | 4/2008 | Iwane et al. | 320/132 |
| 7,378,818 B2 | 5/2008 | Fowler et al. | |
| 2006/0022639 A1 | 2/2006 | Moore | |
| 2008/0197805 A1 | 8/2008 | Pellenc | |
| 2008/0303485 A1 | 12/2008 | Ng | |
| 2009/0027006 A1 | 1/2009 | Vezzini et al. | |
| 2009/0096420 A1 | 4/2009 | Lupu et al. | |
| 2009/0278496 A1 | 11/2009 | Nakao et al. | |

* cited by examiner

*Primary Examiner* — Edward Tso
*Assistant Examiner* — Aaron Piggush
(74) *Attorney, Agent, or Firm* — Noah J. Hayward (57) ABSTRACT

A method of equalizing charge states of individual cells in a battery includes measuring a previous cell voltage for each cell, measuring a previous shunt current for each cell, calculating, based on the previous cell voltage and the previous shunt current, an adjusted cell voltage for each cell, determining a lowest adjusted cell voltage from among the calculated adjusted cell voltages, and calculating a new shunt current for each cell.

10 Claims, 6 Drawing Sheets

DEVICE AND METHOD FOR CONTINUOUSLY EQUALIZING THE CHARGE STATE OF LITHIUM ION BATTERY CELLS

CROSS-REFERENCE TO RELATED APPLICATIONS

This application claims priority to and the benefit of prior-filed U.S. Provisional Application No. 61/363,315, filed Jul. 12, 2010, the content of which is herein incorporated by reference in its entirety.

STATEMENT OF GOVERNMENTAL INTEREST

This invention was made with U.S. Government support under U.S. National Aeronautics and Space Administration (NASA) contract number NNN06AA01C. The U.S. Government has certain rights in the invention.

BACKGROUND OF THE INVENTION

1. Field of the Invention

The present invention generally relates to a device that continuously equalizes the charge state of a battery, e.g., a lithium ion battery, and a control algorithm implemented using the device.

2. Description of the Related Art

There is a continual need for miniaturization of spacecraft electronics to reduce mass, power and assembly cost. While this need extends to all spacecraft systems, substantial benefits can be had by using common spacecraft subsystems that can be easily reused among multiple spacecraft with a minimum amount of reconfiguration. Once such subsystem is lithium ion (Li-Ion) battery charger. However, Li-Ion battery cells, even from a common production lot, do not have perfectly matched parameters such as capacity and cell impedance, for example. As a result, individual cell charge states diverge, especially over multiple charge cycles, and, since the overall capacity of the Li-Ion battery is limited by the cell having the lowest charge state, significant portions of the battery capacity are forfeited. Traditional end-of-charge cell balancing techniques are based on reacting to the cell with the highest potential, resulting in a majority of the cells not being at the maximum charge state. Thus, traditional systems cannot simultaneously establish maximum charge states for all cells in a battery.

Accordingly, there is an ongoing need for improved battery charging devices and control algorithms for the same.

SUMMARY OF THE INVENTION

In accordance with embodiments of the present invention, a method of equalizing charge states of individual cells in a battery includes measuring a previous cell voltage for each cell, measuring a previous shunt current for each cell, calculating, based on the previous cell voltage and the previous shunt current, an adjusted cell voltage for each cell, determining a lowest adjusted cell voltage from among the calculated adjusted cell voltages, and calculating a new shunt current for each cell. In accordance with another embodiment of the present invention, a device includes control circuitry for equalizing charge states of individual cells in a battery. The control circuitry includes a part that measures a previous cell voltage for each cell, a part that measures a previous shunt current for each cell, a part that calculates, based on the previous cell voltage and the previous shunt current, an adjusted cell voltage for each cell, a part that determines a lowest adjusted cell voltage from among the calculated adjusted cell voltages, and a part that calculates a new shunt current for each cell.

In yet another embodiment, a system for equalizing battery cell charge states includes: a battery having first through eighth cells; a first control circuit corresponding to the first and second cells; a second control circuit corresponding to the third through fifth cells; and a third control circuit corresponding to the sixth through eighth cells. Each of the first through third control circuits includes: a voltage sense amplifier, which measures a previous cell voltage for each of the corresponding cells; a current sense amplifier, which measures a previous shunt current for each of the corresponding cells; a part, which calculates, based on the previous cell voltage and the previous shunt current, an adjusted cell voltage for each of the corresponding cells; a part that determines a lowest adjusted cell voltage from among the calculated adjusted cell voltages; and a part which calculates a new shunt current for each of the corresponding cells. The part that calculates the new shunt current for each of the corresponding cells sets the new shunt current for the cell having the lowest adjusted cell voltage to zero, and calculates new shunt currents for each of the remaining cells according to the following equation:

$$ISNn = (\Delta CTp)(VNpi - VLpi)/(B)(VH - VL), \text{ where}$$

ISNn is the new shunt current,
$\Delta CTp$ is the difference between the nominal battery capacity at charge termination and the nominal battery capacity at discharge termination at temperature Tp,
VNpi is the adjusted cell voltage,
VLpi is the lowest adjusted cell voltage from among the adjusted cell voltages of each of the N cells,
B is the target time to substantially fully equalize the charge states,
VH is the cell charge voltage limit, and
VL is the cell discharge voltage limit.

Other embodiments, such as apparatus, system, and method, for example, will become apparent from the following detailed description.

BRIEF DESCRIPTION OF THE DRAWINGS

The above and other features and advantages will become more readily apparent from the detailed description of the invention, accompanied by the drawings, in which.

DETAILED DESCRIPTION

One example aspect of the present invention addresses cell divergence in a lithium ion (Li-Ion) battery. More particularly, one or more embodiments include a device and method, which will herein be referred to as continuous cell equalization, in which a very small current is continuously shunted around a cell (or cells) of the Li-Ion battery that have diverged from the other cell(s). The divergence is determined, for example, based on instantaneous cell voltage data from the lowest charge state cell deviating by more than a predetermined threshold. In continuous cell equalization, cell charge states are continuously matched throughout the charging process, and all cells are "forced" to simultaneously approach the maximum charge state. Battery stack charge current is reduced when the cells simultaneously reach maximum voltage. Accordingly, the battery charge controller, which controls the charging process based on battery (not cell) parameters, charges the battery to full capacity. As compared to conventional approaches, the continuous cell equalization approach more effectively matches the charge state of all cells, while optimizing the effective capacity of the battery. Thus, the present invention provides substantial battery mass/weight savings as compared to conventional approaches.

Figure 1:
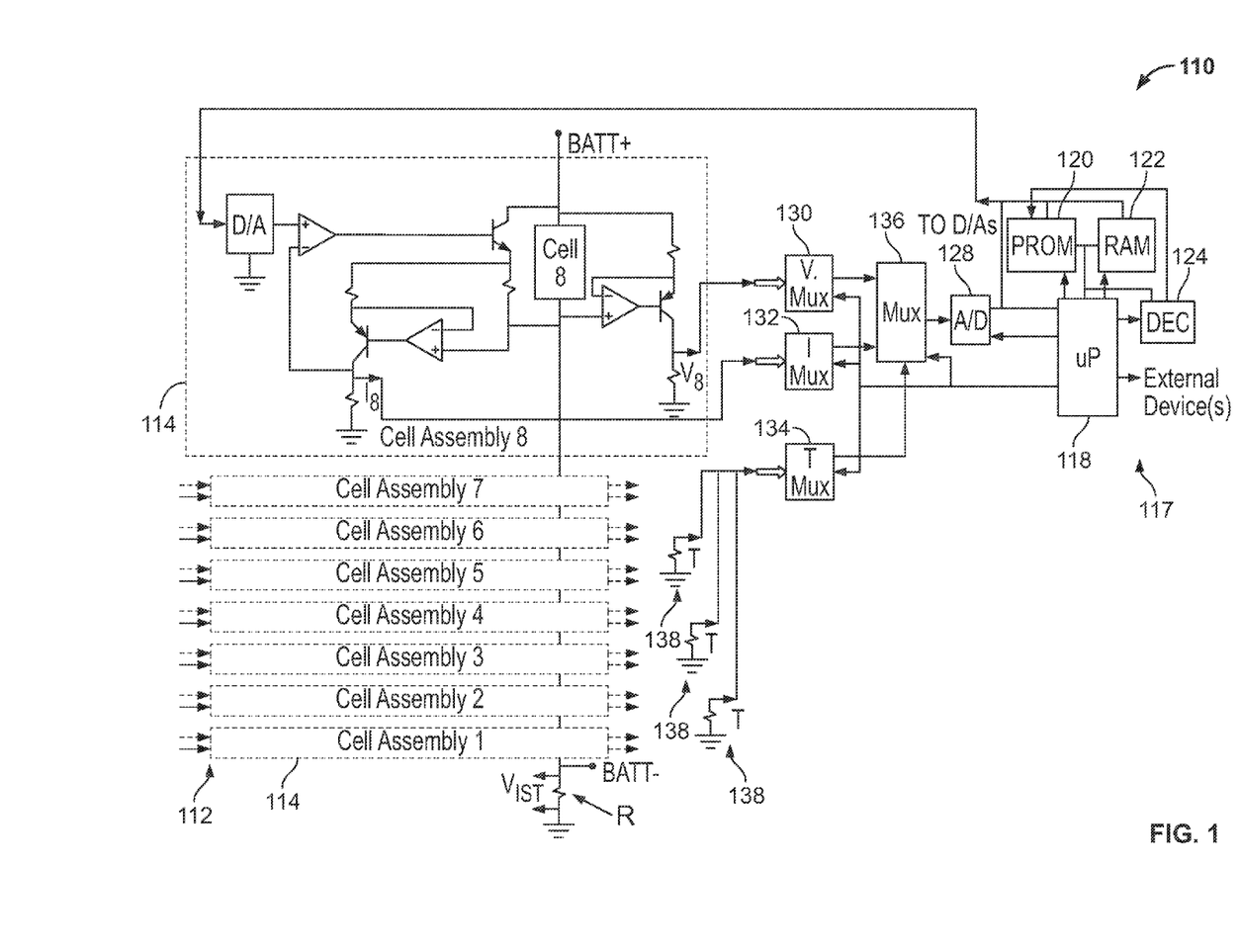
FIG. 1 is a block diagram of a device that continuously equalizes the charge state of individual battery cells according to the present invention.

FIG. 1 is a block diagram of a system for continuously equalizing the charge state of individual battery cells according to example embodiments of the present invention. As shown in FIG. 1, a device 110, also known as a battery management unit (BMU) 110, provides continuous cell equalization for a battery 112, which includes a number of individual cell assemblies 114. Specifically, for example, the battery 112 may include eight cells 114, as shown in FIG. 1, but additional embodiments are not limited thereto.

Parts of the continuous cell equalization device 110 include, but are not limited to, a state machine 117, which itself includes a microprocessor (μP) 118 connected to a programmable read-only memory (PROM) 120, a random access memory (RAM) 122, and a decoder (DEC) 124, and an interface (not shown) which allows one or more connections to/from external components, including, but not limited to, spacecraft systems/subsystems, higher-level battery control systems (e.g., to coordinate/control a plurality of devices 110 and/or batteries 112), and override functions, etc. Although the state machine 117 shown in FIG. 1 includes the microprocessor 118, the PROM 120, the RAM 122, and the DEC 124, it will be understood that additional example embodiments are not limited thereto. Instead, the state machine 117 may include, for example, other (or additional) hardware and/or software components, such as a field programmable gate array (FPGA), an application specific integrated circuit (ASIC), etc.

In a preferred embodiment, the microprocessor 118 receives, via an analog-to-digital converter (A/D) 128, multiplexed voltage (V), current (I), and temperature (T) signals from the battery cells 114. In a preferred embodiment, individual voltage, current, and temperature multiplexers (MUX) 130, 132, and 134, respectively, provide the aforementioned signals to another multiplexer 136, e.g., a general multiplexer 136, which provides a multiplexed signal to the A/D 128.

As shown in FIG. 1, one or more temperature sensors 138 measure and provide the temperature signals, based on temperature(s) associated with the battery, such as battery cell stack temperature, for example, and input the temperature signals to the temperature multiplexer 134. In one embodiment, a single temperature sensor 138 may be used or, alternatively, any number of temperature sensors 138 may be included. In a preferred embodiment, eight (8) temperature sensors 138 correspond to eight (8) cells 114, but it will be noted that the number and correspondence of the temperature sensors 138 is not limited to the foregoing.

The voltage and current signals are provided to their respective multiplexers (130, 132) from each of the cell assemblies 114, as will be described in greater detail below with reference to FIGS. 2-4. Specifically, and as shown in the embodiment illustrated in FIG. 1, for example, for a battery 112 with N=8 cells, the $8^{th}$ cell assembly 114 provides current and voltage signals $I_8$ and $V_8$, respectively, to the corresponding MUX. A voltage $V_{IST}$ that corresponds to a total stack current, e.g., current that flows through the stack of cells 114, is sensed across a resistor R, as shown in FIG. 1.

Figure 2:
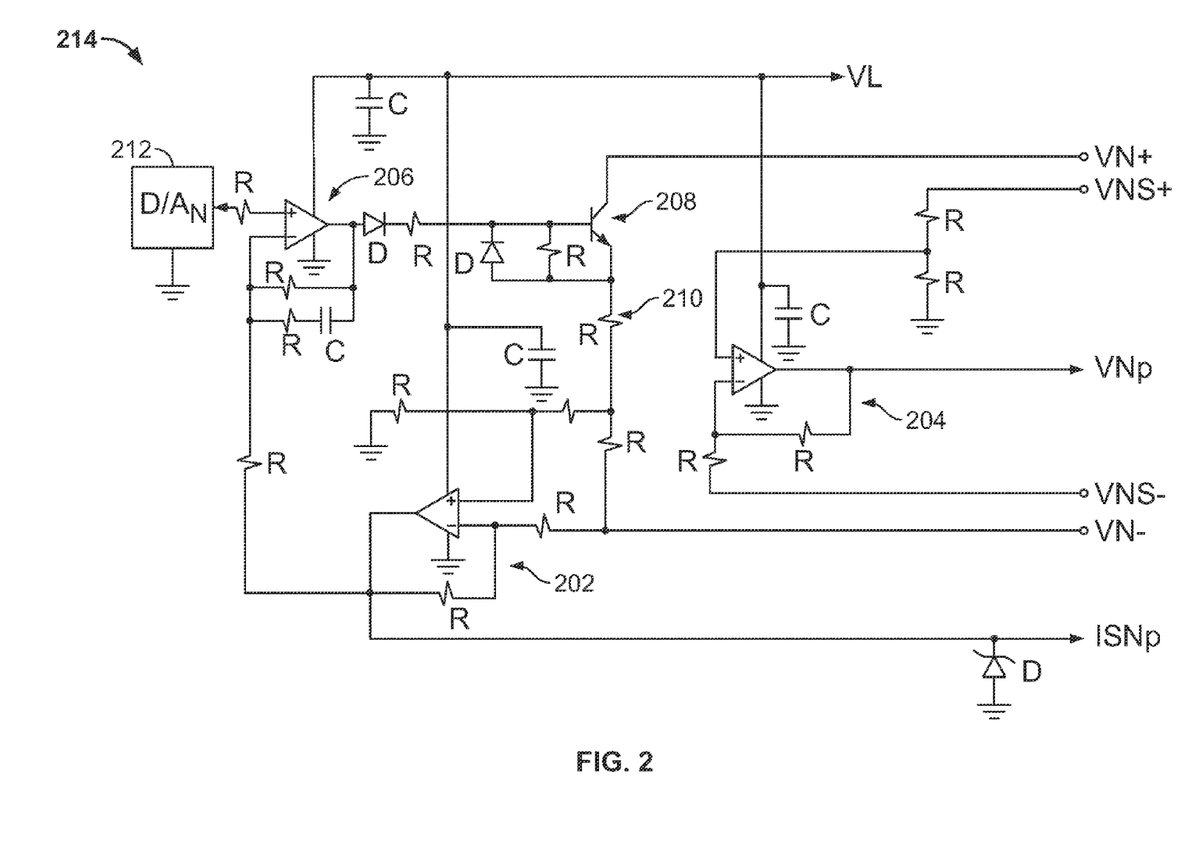
FIG. 2 is a schematic diagram of a cell equalization circuit according to the present invention.
Figure 3:
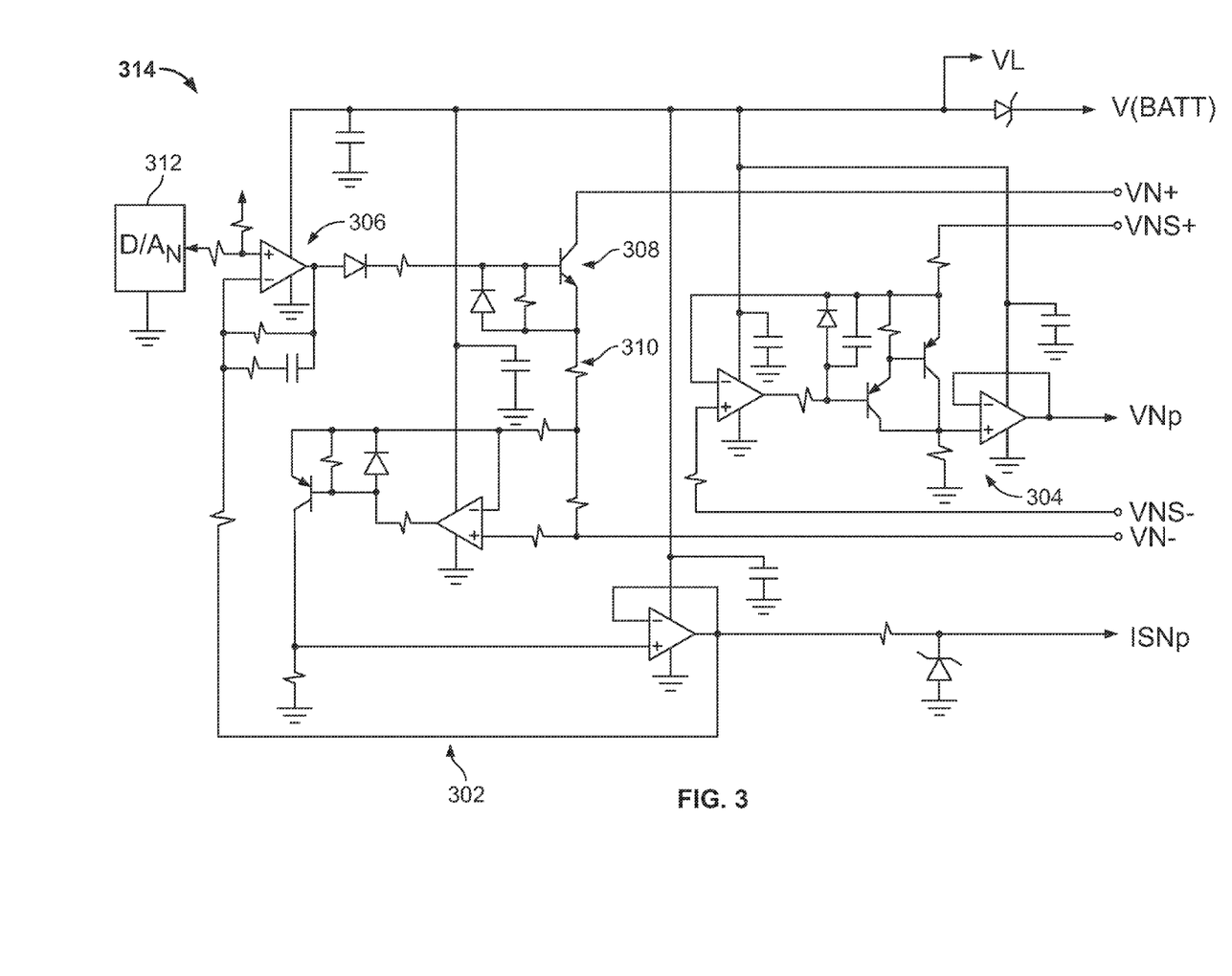
FIG. 3 is a schematic diagram of another cell equalization circuit according to the present invention.
Figure 4:
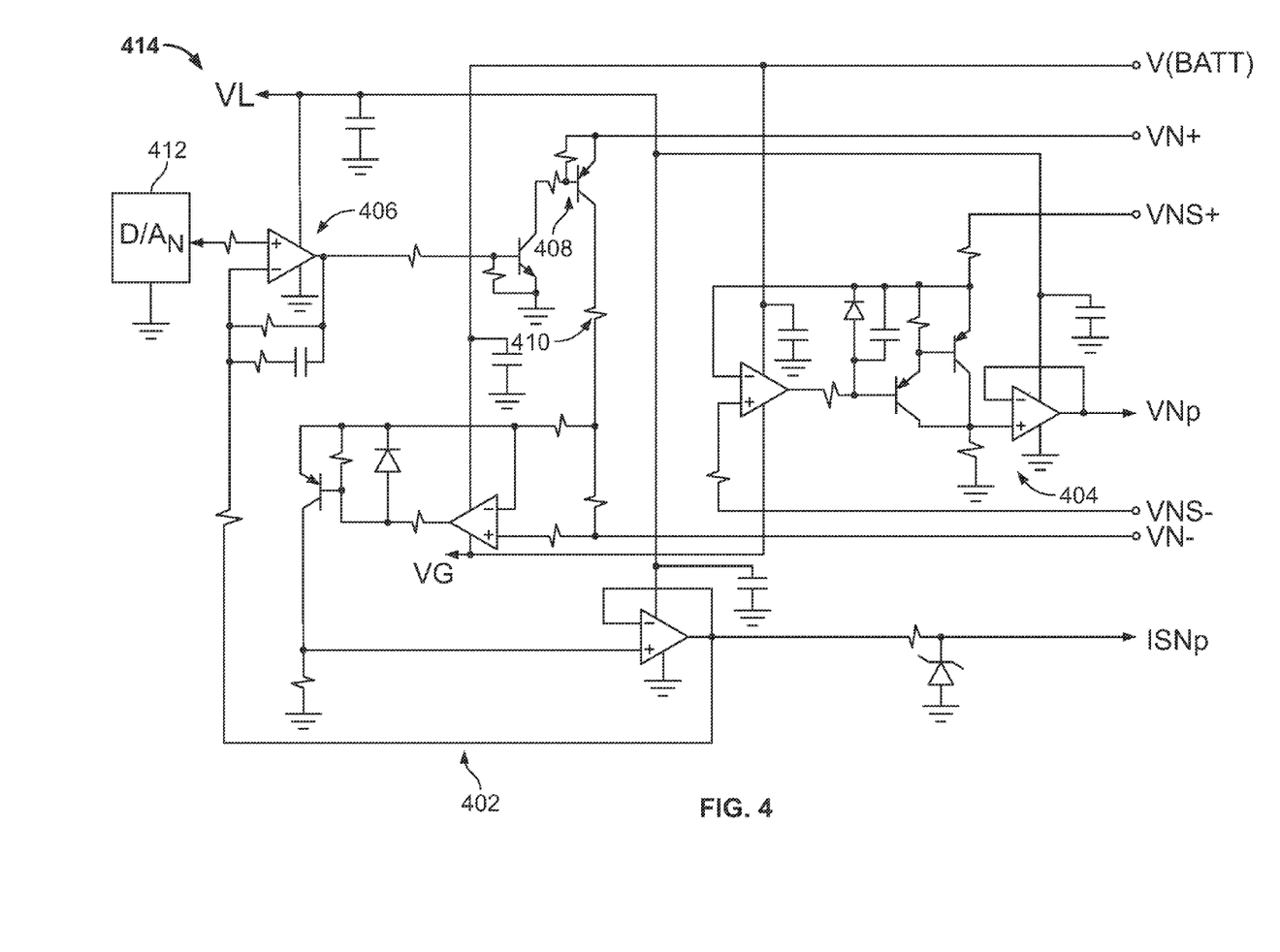
FIG. 4 is a schematic diagram of yet another cell equalization circuit according to the present invention.

FIGS. 2-4 are schematic diagrams of example embodiments of each of the cell assemblies 114 shown in FIG. 1. More particularly, and in the context of the example eight cell Li-Ion battery 112 shown in FIG. 1, FIG. 2 is a schematic diagram corresponding to $1^{st}$ and $2^{nd}$ cell assemblies, FIG. 3 is a schematic diagram corresponding to $3^{rd}$ through $5^{th}$ cell assemblies, and FIG. 4 is a schematic diagram corresponding to $6^{th}$ through $8^{th}$ cell assemblies. While a battery having eight cells is described herein for purposes of illustration, it will be noted that additional embodiments of the present invention are not limited thereto, but instead may have more, or in some cases less, than eight cells.

Referring now to FIG. 2, a cell assembly 214, such as might be used for the $1^{st}$ and $2^{nd}$ cells of an eight cell Li-Ion battery, for example, includes a current sense amplifier 202, a cell voltage sense amplifier 204, a shunt current control amplifier 206, a shunt current pass element 208, a shunt resistance 210, and a digital-to-analog converter (D/A) 212. The current sense amplifier 202, the cell voltage sense amplifier 204, and the shunt current control amplifier 206 are supplied with a voltage VL, which is an upper supply voltage. In one embodiment the voltage VL is picked off of a battery voltage V(BATT), as shown in FIG. 3, but additional embodiments are not limited thereto. Together with a lower supply voltage VG (FIG. 4), which may be a voltage above a ground potential, the current sense amplifier 202, the cell voltage sense amplifier 204, and the shunt current control amplifier 206 are operated within appropriate voltage operating ranges.

The current sense amplifier 202 monitors and controls the instantaneous current being shunted around an individual battery cell 114 to match the desired value from the microcontroller 118 (FIG. 1), as will be described in greater detail below. The cell voltage sense amplifier 204 monitors instantaneous individual battery cell voltage. The shunt current pass element 208 and the shunt resistance 210, in conjunction with the current sense amplifier 202 and the shunt current control amplifier 206, control the current being shunted around an individual battery cell to match the desired value from the microcontroller 118. It will be noted that various additional components, e.g., resistors R, capacitors C, diodes D, operational amplifiers (OPAMPS), and other components/connections are also shown in FIG. 2 but, for purposes of brevity and clarity, will not be fully described herein.

In a preferred embodiment, the D/A 212 receives, from the microprocessor 118 (FIG. 1), a new shunt current signal (ISNn, described in further detail below), which is supplied to the shunt current control amplifier 206. In one embodiment, the shunt current control amplifier 206 is an OPAMP, such as an Analog Devices AD820, but additional embodiments are not limited thereto.

The shunt current control amplifier 206 supplies a signal, optionally via a rectifier/diode, to the shunt current pass element 208, which may be a 2N5335 NPN bipolar junction transistor (BJT), although alternative embodiments are not limited to any such device model (or type of device, for that matter). Based on the signal supplied from the shunt current control amplifier 206, the shunt current pass element 208 controls the shunt current ISN (described below) that bypasses the cell through the shunt resistance 210. As a result, the charge states of all cells are balanced, as described below, and cell divergence is substantially reduced and/or effectively eliminated.

Still referring to FIG. 2, the current sense amplifier 202 determines, e.g., senses or measures, the shunt current of the cell, and provides the cell's previous shunt current ISNp, described below, to the microprocessor 118 via multiplexers (132, 136) and A/D 128 shown in FIG. 1. On the other hand, the voltage sense amplifier 204 determines, e.g., senses, based on a voltage VNS+ at the top of a sense line (not shown) and a voltage VNS− at the bottom of the sense line, the cell's previous (unadjusted) cell voltage VNp, described below, and provides the previous (unadjusted) cell voltage VNp to the microprocessor 118 via multiplexers (130, 136) and A/D 128 (FIG. 1).

Referring now to FIG. 3, a cell assembly 314, such as might be used for the $3^{rd}$ through $5^{th}$ cells of an eight cell Li-Ion battery, for example, includes a current sense amplifier 302, a voltage sense amplifier 304, a shunt current control amplifier 306, a shunt current pass element 308, a shunt resistance 310, and a digital-to-analog converter (D/A) 312. The same or like components from FIG. 2 that are shown in FIG. 3 are substantially similar, and any repetitive detailed description thereof will hereinafter be simplified or omitted.

In a preferred embodiment, the D/A 312 receives, from the microprocessor 118 (FIG. 1), a new shunt current signal ISNn, described below, supplied to the shunt current control amplifier 306. The shunt current control amplifier 306 supplies a signal, optionally via a rectifier/diode, to the shunt current pass element 308. Based on the signal supplied from the shunt current control amplifier 306, the shunt current pass element 308 controls the shunt current ISN (described below) that bypasses the cell through the shunt resistance 310. As a result, the charge state of all cells 114 (FIG. 1) are balanced and, as described below, cell divergence is substantially reduced and/or effectively eliminated.

Still referring to FIG. 3, the current sense amplifier 302 determines the shunt current of the cell, and provides the cell's previous shunt current ISNp to the microprocessor 118 via multiplexers (132, 136) and A/D 128 (best shown in FIG. 1). In addition, the voltage sense amplifier 304 determines, based on a voltage VNS+ at the top of a sense line (not shown) and a voltage VNS− at the bottom of the sense line, the cell's previous (unadjusted) cell voltage VNp, described below, and provides the previous (unadjusted) cell voltage VNp to the microprocessor 118 via multiplexers (130, 136) and A/D 128 (FIG. 1).

Referring now to FIG. 4, a cell assembly 414, such as might be used for the $6^{th}$ through $8^{th}$ cells of an eight cell Li-Ion battery, for example, includes a current sense amplifier 402, a voltage sense amplifier 404, a shunt current control amplifier 406, a shunt current pass element 408, a shunt resistance 410, and a digital-to-analog converter (D/A) 412. The same or like components from FIGS. 2 and 3 that are shown in FIG. 4 are substantially similar, and any repetitive detailed description thereof will hereinafter be simplified or omitted.

In a preferred embodiment, the D/A 412 receives, from the microprocessor 118 (FIG. 1), a new shunt current signal (ISNn), which is thereafter supplied to the shunt current control amplifier 406. The shunt current control amplifier 406 supplies a signal, optionally via a rectifier/diode, to the shunt current pass element 408. Based on the signal supplied from the shunt current control amplifier 406, the shunt current pass element 408 controls the shunt current ISN (described below) that bypasses the cell through the shunt resistance 410. As a result, the charge states of all cells are balanced, as described below, and cell divergence is substantially reduced and/or effectively eliminated.

Still referring to FIG. 4, the current sense amplifier 402 determines the shunt current of the cell, and provides the cell's previous shunt current ISNp, described below, to the microprocessor 118 via multiplexers (132, 136) and A/D 128, as shown in FIG. 1. On the other hand, the voltage sense amplifier 404 determines, based on a voltage VNS+ at the top of a sense line (not shown) and a voltage VNS− at the bottom of the sense line, the cell's previous (unadjusted) cell voltage VNp, described below, and provides the previous (unadjusted) cell voltage VNp to the microprocessor 118 via multiplexers (130, 136) and A/D 128 (FIG. 1).

As previously described, one or more temperature (T) sensors 138 (FIG. 1) provide temperature information, e.g., battery cell stack temperature, to the microprocessor 118, via multiplexers (134, 136) and A/D 128. Using the temperature information, as well as the signals from the cell assemblies (214, 314, 414) described above with reference to FIGS. 2-4, the microprocessor 118 (FIG. 1) determines the charge state of each of the eight cells, as new shunt currents values for each of the eight cells, and supplies a signal to each of the eight cells such that each cell's shunt current is adjusted so that all cells simultaneously reach maximum voltage, i.e., the charge states of the cells converge in a controlled manner, regardless of the initial charge state of any given individual cell.

Figure 5:
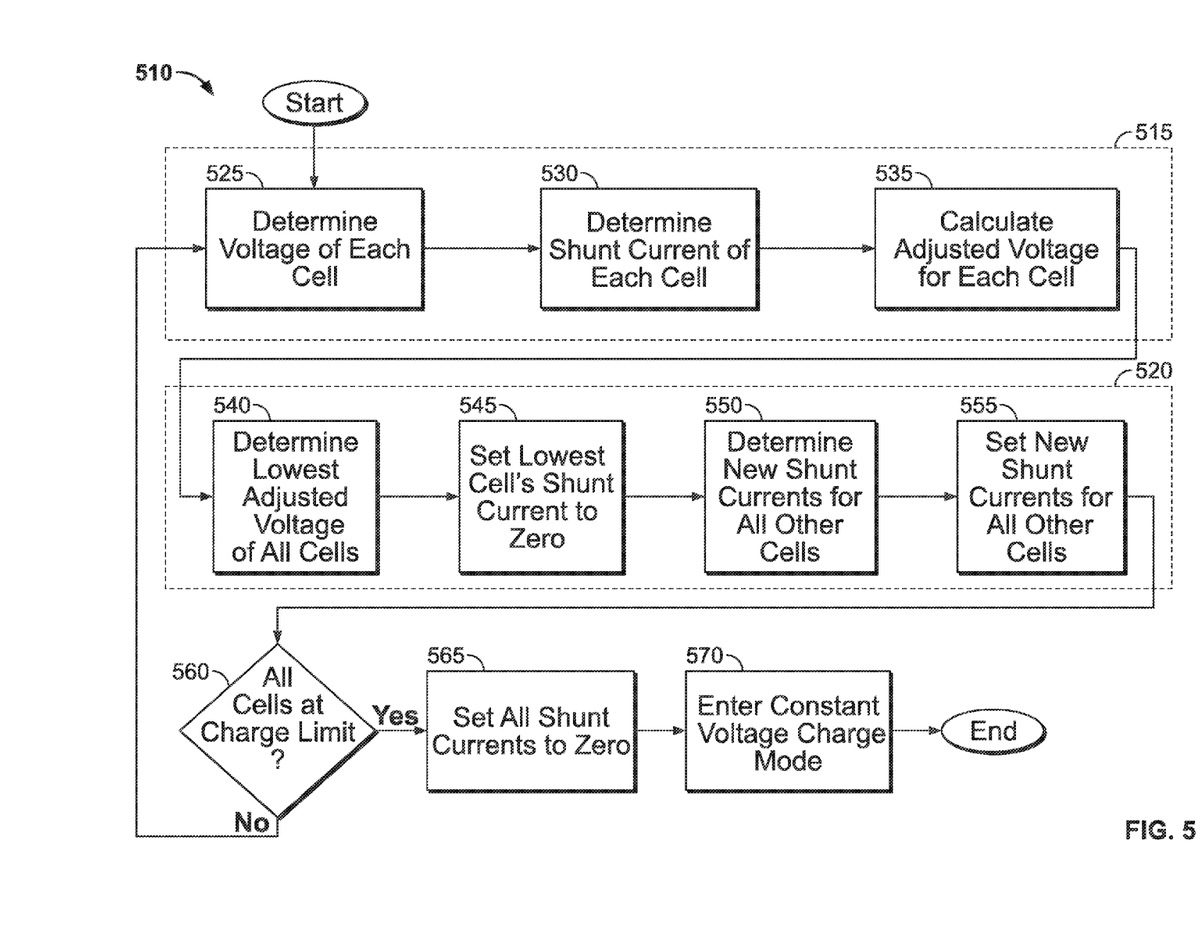
FIG. 5 is a flow chart of a method for continuously equalizing the charge sate of individual battery cells according to the present invention.

FIG. 5 is a flow chart illustrating a method 510 of continuously equalizing the charge sate of individual battery cells (FIG. 1) according to the present invention. Generally speaking, the method 510 includes determining the states of charge for all cells in the battery 515 and then equalizing the charge states 520. Specifically, in step 525, the previous cell voltage of each cell is determined, e.g., is measured, as described in greater detail above. In step 530, the previous shunt current of each cell is determined, and an adjusted cell voltage is calculated (step 535) based the voltage and current calculated in steps 525 and 530, as well as the temperature-corrected nominal cell impedance. More specifically, the adjusted cell voltage is calculated according to:

$$VNpi = VNp + (ZTp)(ISNp), \text{ where}$$

VNpi is the previous voltage on cell N, adjusted for the previous cell N shunt current, VNp is the unadjusted previous voltage on cell N, ZTp is the nominal cell impedance at temperature Tp, and ISNp is the previous shunt current for cell N.

After the adjusted cell voltage VNpi is calculated in step 535, the lowest adjusted cell voltage VLpi of all of the N cells is determined in step 540, and, in step 545, the shunt current ISN is set to zero (0) for the cell having the lowest adjusted cell voltage VLpi. Optionally, to prevent oscillations or "hunting" for cell(s) very close to VLpi, a deadband D can be set, such as in 0.1 volt increments, for example, such that ISNn is set to zero (0) for all cells having VNpi less than or equal to VLpi+d.

In step 550, new shunt currents ISNn are calculated for the remaining (N−1) cells. Specifically, the new shunt currents ISNn are calculated according to:

$$ISNn = (\Delta CTp)(VNpi - VLpi)/(B)(VH - VL), \text{ where}$$

ISNn is the new shunt current, $\Delta CTp$ is the difference between the nominal battery capacity at charge termination and the nominal battery capacity at discharge termination at temperature Tp, VNpi is the adjusted cell voltage, VLpi is the lowest adjusted cell voltage from among the adjusted cell voltages of each of the N cells, B is the target time to substantially fully equalize the charge states, VH is the cell charge voltage limit, and VL is the cell discharge voltage limit.

Figure 6:
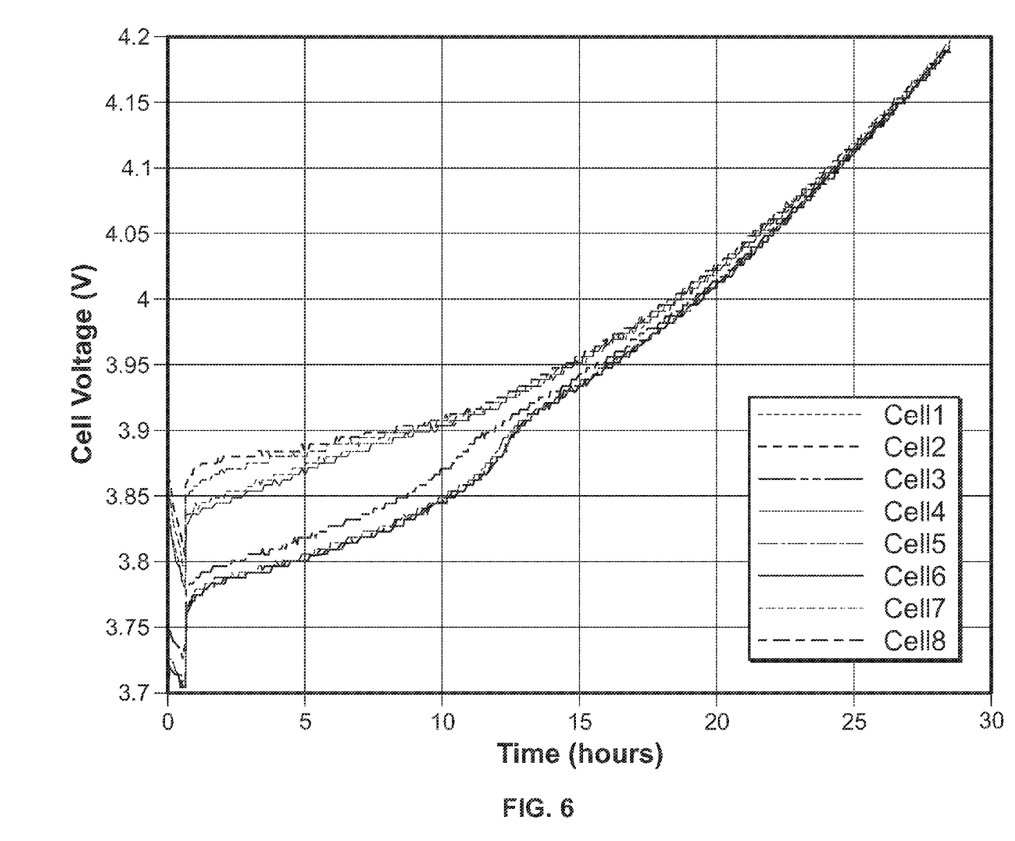
FIG. 6 is a data graph of voltage versus time illustrating convergence of individual battery cell voltages in a device according to the present invention.

In step 555, signals corresponding to the new shunt currents ISNn are sent to the respective cell assemblies 114 (FIG. 1) and, accordingly, each cell's shunt current is adjusted such that all cells simultaneously reach maximum voltage, i.e., the charge states of the cells converge in a controlled manner, regardless of the initial charge state of any given individual cell. This aspect is shown in FIG. 6, which is a graph of cell voltages, in volts (V), versus time, in hours, taken from a device and algorithm according to the present invention for an eight cell Li-Ion battery charge cycle. More particularly, as can be seen in FIG. 6, the individual cell voltages, which are initially in mismatched charge states, converge in a controlled manner during charging of the battery.

Referring again to FIG. 5, in step 560, it is determined whether all cells are at their charge limit, i.e., whether all adjusted cell voltages VNpi are equal to the respective associated cell charge voltage limit VH. If not, the determination of cell charge states 515 begins again; otherwise, all shunt currents ISN are set to zero (0) in step 565, and constant voltage charge mode is entered (step 570).

In constant voltage charge mode 570, also referred to as current taper mode, a voltage is applied to the battery, instead of the charge current, such that the battery is "topped off," e.g., is fully charged. More particularly, when all cells reach VH, the charge current is turned off and, instead, a voltage, which is greater than the battery voltage V(BATT), is applied to the cell stack such that the cells pull a battery stack current, which is limited to a predetermined value, such as $\Delta CTp/100$, for example. When the battery stack current reaches a predetermined lower value (due to a decrease in voltage difference as the stack fully charges), e.g., $\Delta CTp/500$, max battery charge current is set to zero (0), and the battery is considered fully charged.

It will be understood that various modifications may be made to the embodiments disclosed herein. Therefore, the above description should not be construed as limiting the scope of the invention, but merely as illustrating exemplifications of preferred embodiments. Those skilled in the art will readily envision other modifications within the scope and spirit of the present invention as defined by the appended claims.

What is claimed is:

1. A method of equalizing charge states of individual cells in a battery, the method comprising:
   measuring a previous cell voltage for each cell;
   measuring a previous shunt current for each cell;
   calculating, based on the previous cell voltage and the previous shunt current, an adjusted cell voltage for each cell;
   determining a lowest adjusted cell voltage from among the calculated adjusted cell voltages; and
   calculating a new shunt current for each cell, wherein the calculating the new shunt current for each cell comprises:
   setting the new shunt current for the cell having the lowest adjusted cell voltage to zero; and
   calculating a new shunt current for each of the remaining cells according to the following equation:

$ISNn = (\Delta CTp)(VNpi - VLpi)/(B)(VH-VL)$, where

ISNn is the new shunt current,
   $\Delta CTp$ is the difference between the nominal battery capacity at charge termination and the nominal battery capacity at discharge termination at temperature Tp,
   VNpi is the adjusted cell voltage,
   VLpi is the lowest adjusted cell voltage from among the adjusted cell voltages of each of the N cells,
   B is the target time to substantially fully equalize the charge states,
   VH is the cell charge voltage limit, and
   VL is the cell discharge voltage limit.

2. The method of claim 1, wherein the calculating the previous shunt current comprises:
   multiplying the previous shunt current by a temperature-corrected nominal cell impedance to produce a result; and
   adding the result to the previous cell voltage.

3. The method of claim 1, further comprising, when the adjusted cell voltage of each of the cells is substantially equal to the cell charge voltage limit:
   setting the new shunt current for each of the cells to zero;
   applying a charge voltage to a stack, which includes all of the cells, to generate a battery stack charge current through the stack;
   limiting battery stack charge current to approximately $\Delta CTp/100$; and
   setting the battery stack charge current to zero when the battery stack charge current is less than or equal to approximately $\Delta CTp/500$.

4. A device for equalizing charge states of individual cells in a battery, the device comprising:
   control circuitry including
      a voltage sense amplifier which measures a previous cell voltage for each cell,
      a current sense amplifier which measures a previous shunt current for each cell,
      a part which calculates, based on the previous cell voltage and the previous shunt current, an adjusted cell voltage for each cell,
      a part which determines a lowest adjusted cell voltage from among the calculated adjusted cell voltages, and
      a part which calculates a new shunt current for each cell, wherein the part which calculates the new shunt current for each cell:
      sets the new shunt current for the cell having the lowest adjusted cell voltage to zero; and
      calculates new shunt currents for each of the remaining cells according to the following equation:

$ISNn = (\Delta CTp)(VNpi - VLpi)/(B)(VH-VL)$, where

ISNn is the new shunt current,
   $\Delta CTp$ is the difference between the nominal battery capacity at charge termination and the nominal battery capacity at discharge termination at temperature Tp,
   VNpi is the adjusted cell voltage,
   VLpi is the lowest adjusted cell voltage from among the adjusted cell voltages of each of the N cells,
   B is the target time to substantially fully equalize the charge states,
   VH is the cell charge voltage limit, and
   VL is the cell discharge voltage limit.

5. The device of claim 4, wherein the part which calculates a new shunt current for each cell:
   multiplies the previous shunt current by a temperature-corrected nominal cell impedance; and
   adds the result of the multiplying to the previous cell voltage.

6. The device of claim 4, further comprising:
a part which sets the new shunt current for each of the cells to zero when the adjusted cell voltage of each of the cells is substantially equal to the cell charge voltage limit;
a part which applies a charge voltage to a stack, which includes all of the cells, to generate a battery stack charge current through the stack;
a part which limits the battery stack charge current to approximately $\Delta CTp/100$; and
a part which sets the battery stack charge current to zero when the battery stack charge current is less than or equal to approximately $\Delta CTp/500$.

7. The device of claim 4, further comprising a plurality of control circuits, each of which corresponds to a fixed number of individual cells.

8. The device of claim 7, wherein
the battery includes eight cells, and
the plurality of control circuits comprises:
  a first control circuit corresponding to the first and second cells;
  a second control circuit corresponding to the third through fifth cells; and
  a third control circuit corresponding to the sixth through eighth cells.

9. The device of claim 4, further comprising:
a shunt current control amplifier which controls the current being shunted a given individual cell based on the calculated new shunt current corresponding to the individual cell;
a shunt pass element connected to the shunt current control amplifier; and
a shunt resistance connected to the shunt pass element and through which the shunt current flows.

10. A system for equalizing battery cell charge states, the system comprising:
a battery including first through eighth cells;
a first control circuit corresponding to the first and second cells;
a second control circuit corresponding to the third through fifth cells; and
a third control circuit corresponding to the sixth through eighth cells,
wherein each of the first through third control circuits comprises:
  a voltage sense amplifier which measures a previous cell voltage for each of the corresponding cells;
  a current sense amplifier which measures a previous shunt current for each of the corresponding cells;
  a part which calculates, based on the previous cell voltage and the previous shunt current, an adjusted cell voltage for each of the corresponding cells;
  a part which determines a lowest adjusted cell voltage from among the calculated adjusted cell voltages; and
  a part which calculates a new shunt current for each of the corresponding cells, and
wherein the part which calculates the new shunt current for each of the corresponding cells:
sets the new shunt current for the cell having the lowest adjusted cell voltage to zero; and
calculates new shunt currents for each of the remaining cells according to the following equation:

$ISNn = (\Delta CTp)(VNpi - VLpi)/(B)(VH-VL)$, where

ISNn is the new shunt current,
$\Delta CTp$ is the difference between the nominal battery capacity at charge termination and the nominal battery capacity at discharge termination at temperature Tp,
VNpi is the adjusted cell voltage,
VLpi is the lowest adjusted cell voltage from among the adjusted cell voltages of each of the N cells,
B is the target time to substantially fully equalize the charge states,
VH is the cell charge voltage limit, and
VL is the cell discharge voltage limit.

* * * * *